United States Patent [19]

Keesen et al.

[11] Patent Number: 5,055,927
[45] Date of Patent: Oct. 8, 1991

[54] DUAL CHANNEL VIDEO SIGNAL TRANSMISSION SYSTEM

[75] Inventors: Heinz-Werner Keesen; Dietmar Hepper; Hartmut Peters, all of Hanover, Fed. Rep. of Germany

[73] Assignee: Deutsche Thomson-Brandt GmbH, Fed. Rep. of Germany

[21] Appl. No.: 402,701

[22] Filed: Sep. 5, 1989

[30] Foreign Application Priority Data

Sep. 13, 1988 [DE] Fed. Rep. of Germany ....... 3831103
Sep. 13, 1988 [DE] Fed. Rep. of Germany ....... 3831104

[51] Int. Cl.$^5$ .......................... H04N 7/00; H04N 7/13
[52] U.S. Cl. ...................................... 358/133; 358/141
[58] Field of Search .................... 358/11, 12, 140, 141, 358/133

[56] References Cited

U.S. PATENT DOCUMENTS

| | | | |
|---|---|---|---|
| 4,383,272 | 5/1983 | Netravali et al. | 358/105 |
| 4,581,640 | 4/1986 | Cole | 358/141 |
| 4,628,344 | 12/1986 | Glenn | 358/141 |
| 4,668,986 | 5/1987 | Furukawa | 358/105 |
| 4,684,984 | 8/1987 | Hirano | 358/136 |
| 4,907,069 | 3/1990 | Bretl | 358/12 |
| 4,931,855 | 7/1990 | Salvadorini | 358/12 |
| 4,989,089 | 1/1991 | Chantelon et al. | 358/136 |

FOREIGN PATENT DOCUMENTS 2920303 11/1980 Fed. Rep. of Germany .
3306765 4/1984 Fed. Rep. of Germany .
3410518 4/1984 Fed. Rep. of Germany .

OTHER PUBLICATIONS

Weckenbrock et al., "Advanced Compatible Television", Fernseh- und Kino-Technik, 42 Jg., Nr. 7, 1988, pp. 305–311.
Pazarci et al., "A Matched-Resolution Wide Aspect-Ratio HDTV System", IEEE Transactions on Consumer Electronics, vol. 34, Feb. 1988, pp. 54–60.
Sauerburger et al., "Zweikanalige Satellitenubertragung Von HDTV-Signalen", Rundfunktech Mitteilungen, Jahrg. 28 (1984).
Tetzner, "Erine neue Fernschnorm und ihre Folgen", ELO 2/1988, pp. 44–48.
Glenn et al., "Improved HDTV with Compatible Transmission", Third International Colloquium on Advanced Television Systems: HDTV '87, Oct. 4–8, 1987.
Tsinberg, "ENTSC Two-Channel Compatible HDTV System", IEEE Transactions on Consumer Electronics, vol. CE-33, No. 3, Aug. 1987, pp. 146–153.
Cavellerano, "Decomposition and Recombination of a Wide Aspect Ratio Image for ENTSC Two-Channel Television", IEEE Transactions on Consumer Electronics, vol. CE-33, No. 3, Aug. 1987, pp. 162–171.

Primary Examiner—John W. Shepperd
Attorney, Agent, or Firm—Joseph S. Tripoli; Eric P. Herrmann; Ronald H. Kurdyla

[57] ABSTRACT

Video signal information derived from a high definition source is conveyed via two channels. A first channel conveys relatively low spatial resolution, high temporal resolution video information compatible with a standard television receiver. An auxiliary second channel conveys relatively high spatial resolution, low temporal resolution video information. A high definition television receiver reconstructs original high definition information from the first and second channel information.

32 Claims, 4 Drawing Sheets

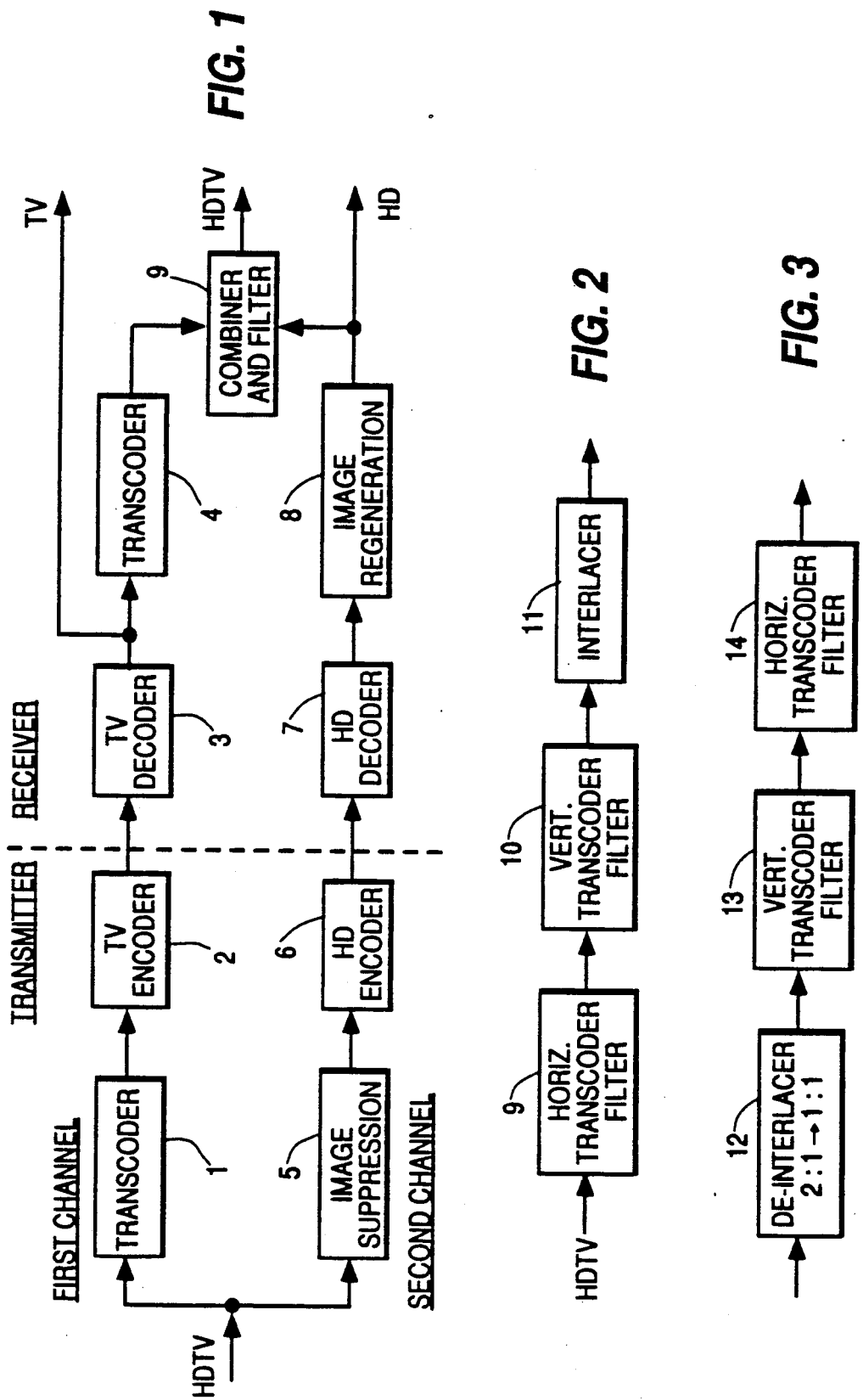

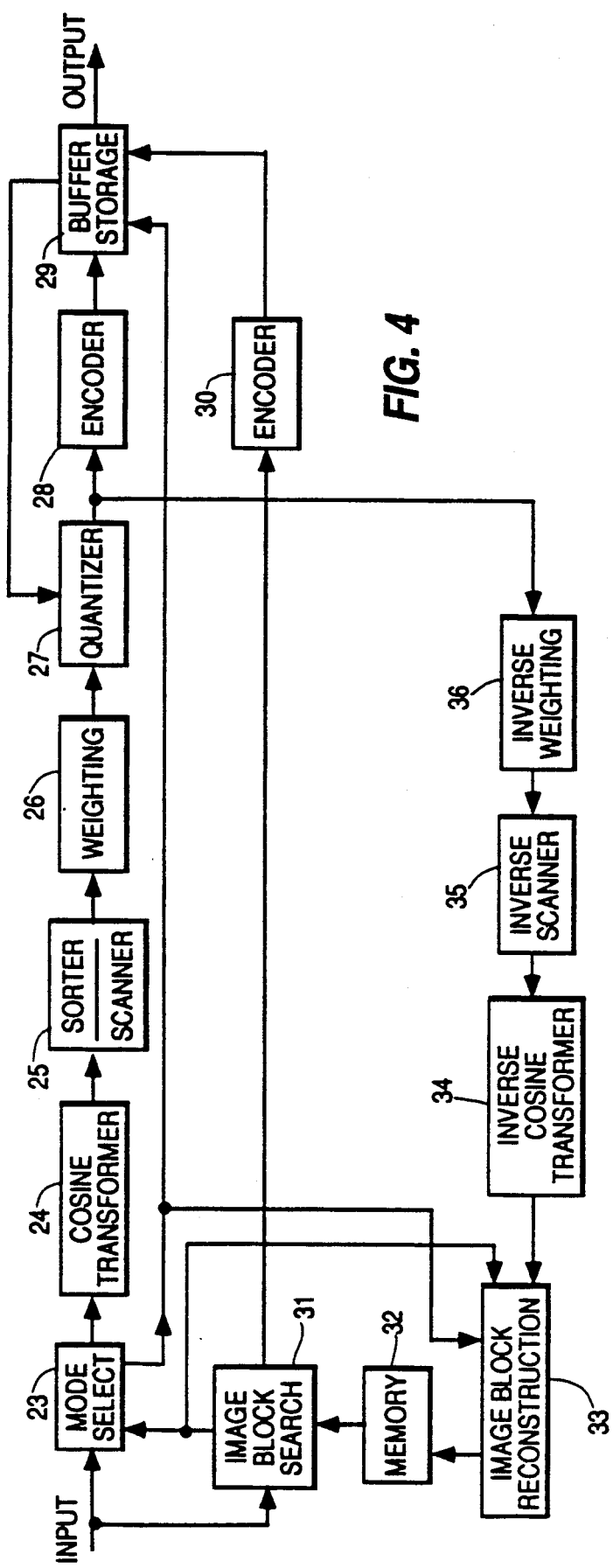
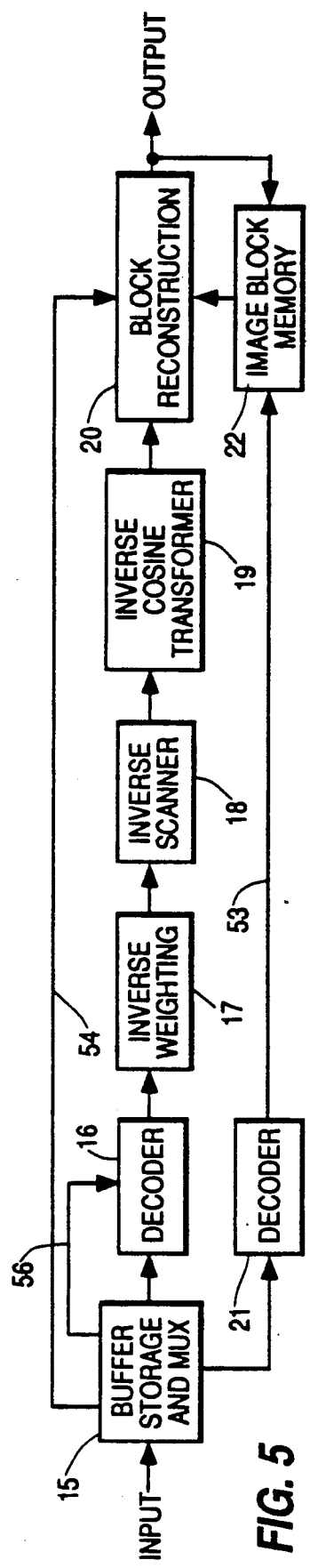
FIG. 4
FIG. 5

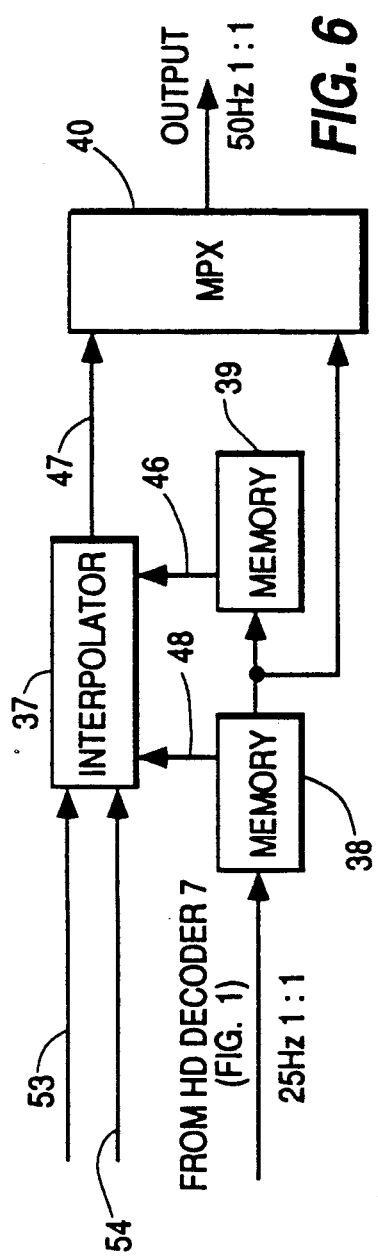
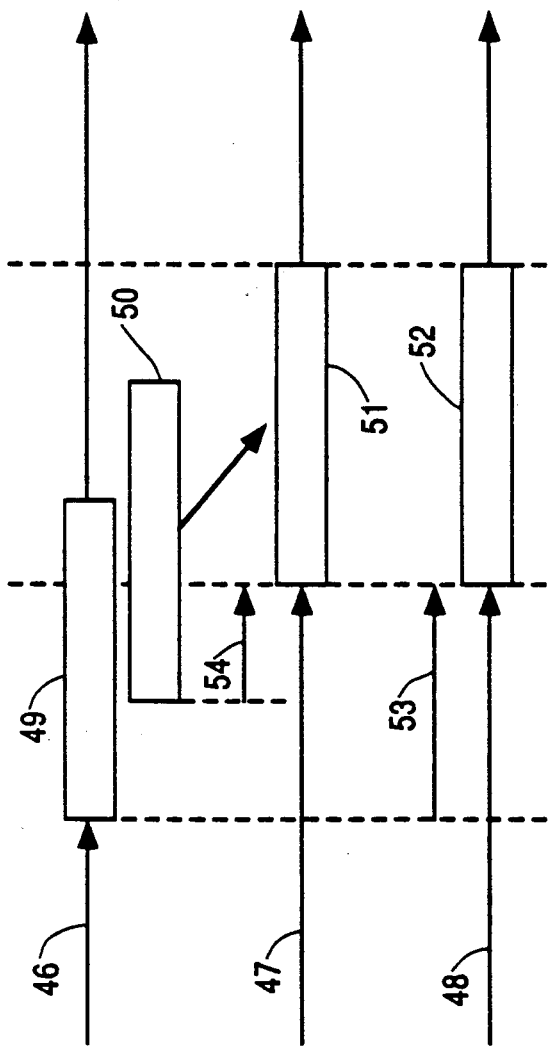

DUAL CHANNEL VIDEO SIGNAL TRANSMISSION SYSTEM

The invention concerns a two channel television signal transmission system for transmitting video information derived from a high definition video source.

In the proceedings of the meetings of a 1987 HDTV colloquium, from Oct. 4 through 8, 1987, a transmitting system has been suggested in an article titled "Improved HDTV with Compatible Transmission" by William E. Glenn and Karen G. Glenn of the New York Institute of Technology. The suggested system allows the reception of a high definition television (HDTV) signal as well as the reception of a standard television (TV) signal. In such system an HDTV signal is separated by means of a digital signal processor and a two-dimensional spatial filter to produce a standard TV signal and a signal which contains high spatial frequency portions of the HDTV signal.

Both signals are transmitted via two separate band restricted channels. One channel transmits the standard TV signal, and an auxiliary second channel transmits high spatial frequency portions of the HDTV signal. The standard TV signal can be received by a standard TV receiver. By evaluating the signal content of both channels, a suitable HDTV receiver can reconstruct and reproduce the high definition picture from the original source. A high resolution picture cannot be reconstructed and reproduced solely from the information contained in the auxiliary second channel.

The present invention concerns a system which allows the reconstruction of picture information in the case of existing bandwidth restricted transmitting channels on the receiver side, even if only one channel can be received.

At the transmitter an HDTV signal with high temporal and spatial resolution is split into two signals. The first signal is characterized by low spatial resolution but high temporal resolution. By using an appropriate code, such signal can be transformed into a standard TV signal, e.g. PAL, Secam, NTSC or D2-MAC, or it may be transmitted digitally with or without data reduction via a first bandwidth restricted channel.

The second signal is characterized by high spatial resolution and a low temporal resolution. This can be achieved, for example, by eliminating image information, e.g., via a subsampling process which removes every second image frame. By means of an appropriate encoder the signal can be transformed into an HD-MAC signal, or it can be transmitted digitally with or without data reduction, through a second bandwidth restricted channel. On the receiver side, a complete low spatial resolution, high temporal resolution image signal can be received via the first channel.

In contrast to the state of the art, a complete low temporal resolution, and high spatial resolution video signal can be received via the second channel, and a suitable (spatially) high definition image signal can be reconstucted using appropriate decoding and image regeneration processes. These processes reconstruct information which is lost at the receiver via the image removal process practiced at the receiver, particularly in the case of motion sequences, as far as possible.

In order to regenerate a complete HDTV signal, both channels have to be evaluated at the receiver. For this purpose, particularly in the case of image motion, the high temporal resolution image information of the first channel is used for reconstructing the high definition image.

The signal of the second channel is supplemented with information from the first channel. While receiving the second channel this information can be evaluated by the receiver to the effect that the receiver automatically allows the reception of the first channel by means of an appropriate evaluation circuit.

The disclosed transmission system according to the invention advantageously is a high definition system which is compatible with the standard TV transmission system. In the disclosed system the first channel provides a picture signal with a resolution in accordance with the existing conventional television standards of today, and the second channel provides a picture signal with higher spatial resolution.

In the drawing:

FIG. 1 shows a two channel television signal transmission system according to the present invention;

FIGS. 2-6 and 8 show details of portions of the system of FIG. 1; and

FIG. 7 shows a signal diagram helpful in understanding the operation of the system.

Figure 8:
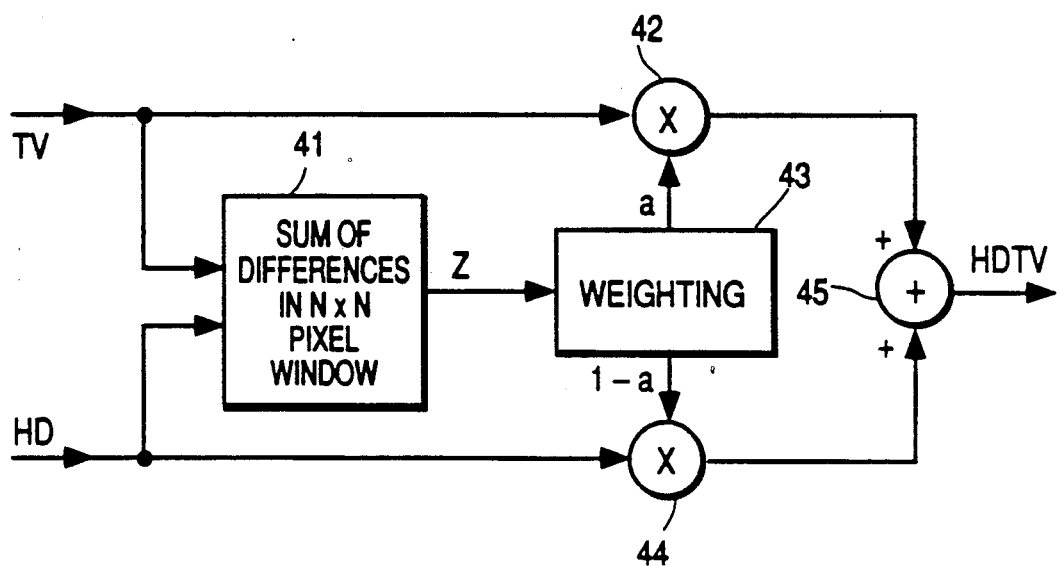

In FIG. 1 a high definition television signal HDTV from a source such as a television camera is fed to a first transmission path comprising a transcoder 1, a TV signal encoder 2, a TV signal decoder 3 and a transcoder 4. A second transmission path comprises an image suppression circuit 5, an HD encoder 6, an HD decoder 7 and an image regeneration circuit 8.

Transcoder 1 of the first transmission path, via appropriate filtering networks, reduces horizontal image resolution by a rate of 2:1, and reduces vertical image resolution by a rate of 3:2. In addition input signal HDTV, which is non-interlaced, is transformed into an interlaced signal whereby temporal resolution is preserved. The output signal of transcoder 1 is fed to TV encoder 2 which produces a standard TV signal, e.g. in PAL, Secam, NTSC or D2-MAC format, and the output of which is connected to an output of the first transmission channel for broadcast via an appropriate medium. Alternatively, if the output of the transcoder is to be stored, e.g., via a digital recorder, it is transferred either directly or via a data reduction network to a recording channel.

In the receiver portion of the first transmission channel the incoming standard TV signal is decoded in a TV decoder 3. A standard TV signal is produced at the output of decoder 3.

In the second channel the HDTV signal is subjected to a process of suppressing or eliminating image information for the purpose of adapting the HDTV signal to the bandwidth-restricted second transmission channel. Picture suppression circuit 5 permits, e.g., only every other picture frame to be transmitted such as by means of a 2:1 subsampling process. The suppression of more than just every other image frame is possible in the presence of motionless image information, so that the channel capacity which becomes available can be used for the coding and transmission of the other image information. The output signal from picture suppression circuit 5 is coupled to an HD (high definition) encoder 6. HD encoder 6 either produces an analog signal, for example an HD-MAC signal, or a digital signal, which is transmitted either directly or after data reduction.

In the receiver for the second transmission channel, the incoming signal is applied to an HD decoder 7. The output of HD decoder 7 is connected to a picture regenerating circuit 8, which reconstructs images removed at the transmitter via a motion estimation technique involving comparison of blocks of image pixels. At the output of circuit 8 an HD signal with high spatial resolution and with a scanning rate of e.g. 50 Hz is provided, but with possible errors in the case of image motion.

In order to reduce these errors in areas of image motion to thereby increase temporal resolution of the incoming HDTV signal, from the standard TV signal a transcoder 4 performs an inversion of the scanning rate conversion previously performed by transcoder 1. Output signals from transcoder 4 and from picture regeneration circuit 8 are applied to a signal combining and filtering network 9, which by means of appropriate signal weighting delivers an HDTV output signal with high temporal and spatial resolution.

FIG. 2 shows additional details of transcoder 1 in the transmitter of FIG. 1. Input signal HDTV is applied to a horizontal transcoder filter 9, which lowers the horizontal scanning rate by 2:1 by means of appropriate filtering. A suitable procedure for this purpose is decribed by Pirsch, et al. in "Changing the Sampling Rate of Video Signals by Rational Factors", published in Proc. EUSIPCO '83, Signal Processing II: Theories and Applications, EURASIP 1983, pp. 171-174. The signal from unit 9 is further processed by vertical transcoder filter 10, which lowers the vertical scanning rate by 3:2. Subsequently, the signal is vertically low pass filtered and afterwards processed by an interlacer 11, which carries out a frame-dependent vertical sub-sampling of 2:1 to produce a line interlaced video signal.

If the HDTV signal at the input of transcoder 1 contains, for example, 1440×864 active picture elements (pixels) per image with an image repetition frequency of 50 Hz and progressive scanning of 1:1, the image pixel format is reduced in the following steps: 720×864 pixels at 50 Hz, 1:1; then 720×576, 50 Hz, 1:1; then 720×576, 50 Hz, 2:1 interlaced.

FIG. 3 shows addiitonal details of transcoder 4 in the receiver of FIG. 1. The input standard television signal TV, present in the form of digital scanning values, is applied to a de-interlacer 12 which, by frame-dependent line processing and interpolation of intermediate lines, generates a video signal with the format 720×576 pixels, 50 Hz, 1:1 non-interlaced from a video signal with the format 720×576 pixels, 50 Hz, 2:1 interlaced. This signal is applied to a vertical transcoder filter 13, which regenerates a signal in the format 720×864 pixels, 50 Hz, 1:1 by means of vertical scanning rate conversion. By means of a subsequent horizontal transcoder filter 14 with a horizontal scanning rate conversion factor of 1:2, a video signal with 1440×864 pixels, 50 Hz, 1:1 is generated with a format similar to that of the HDTV input signal.

FIG. 4 shows details of HD encoder 6 of FIG. 1. The HDTV signal from the output image-suppression circuit 5 is applied to a mode selection circuit 23 and to an image block search circuit 31.

In the mode selection circuit 23, by comparing the input signal with an output signal from block search circuit 31, either an interframe or an intraframe mode is chosen for coding the input signal. The coding is performed, for example, consistently for an image block which contains 8×8 pixels. If the deviations between the actual and the preceding picture are too large, intraframe coding is used. In the other cases interframe coding is used to obtain data reduction. In the interframe mode the picture signal is predicted along the previously determined motion vectors, and the difference signal between the original and the predicted signal is transmitted. In the intraframe mode the input signal itself is advanced. The image block search circuit 31 establishes a motion vector for each actual image block. The motion vector can be determined e.g. from the minimum sum of the absolute values of the differences, from the minimum sum of the alternating energy or from the minimum variance.

From mode selection circuit 23 the signal is applied to a discrete cosine transformer 24. Its output signal is scanned by a sorter (scanner) 25, and is subsequently coupled to a signal weighting circuit 26 and to a quantizer 27. The output signal of quantizer 27 is coupled to an encoder 28 and to an inverse weighting network 36 for reconstruction of the image signal, followed by an inverse scanner 35 and an inverse discrete cosine transformer 34 of a block reconstruction circuit 33, the output of which is connected to a picture memory 32.

Encoder 28 receives quantized weighted transformation coefficients as input signals in a sequence which is determined by the scanning. For the purpose of data reduction it uses variable word length coding and provides coefficients and addresses which are encoded as an output signal. This output signal is applied to a videomultiplexer and buffer storage unit 29 from which an OUTPUT signal is provided.

The data stored in picture memory 32 are data pertaining to the preceding image. Such data are needed to determine motion information for an actual image block. For this purpose an image block comprising 8×8 pixels of the actual picture (within a search area of the preceding picture comprising e.g. 16×16 pixels) is shifted in position within the 16×16 block by means of the so-called block matching method until a position of the actual image block has been found in the preceding image block where the lowest number of divergences are detected. A vector is determined from this newly established position, and is coupled to mode selection circuit 23 and to an encoder 30. Encoder 30 also employs variable word length and transmits the coded motion vector to videomultiplexer and buffer storage 29 for intermediate storing together with the corresponding signal data. For the purpose of controlling the quantization operation, an output of buffer storage 29 is connected to a control input of quantizer 27. The result of the mode selection from unit 23 is applied to videomultiplexer and buffer storage unit 29 and, for the correct block reconstruction, to block reconstruction circuit 33. The output signal from buffer storage unit 29 is applied to the second transmission channel at a constant data rate.

FIG. 5 shows additional details of HD decoder 7 of FIG. 1, with an input buffer storage and videomultiplexer 15. Separate outputs of buffer storage unit 15 lead to decoders 16 or 21 respectively. An output of decoder 16 leads through an inverse weighting unit 17, an inverse scanner unit 18, and an inverse discrete cosine transformer 19 to a block reconstruction circuit 20. The output of block reconstruction circuit 20 leads to image regeneration circuit 8 of FIG. 1 as well as to an image block memory 22. The output of decoder 21 with decoded motion vector information is applied to a further input of image block memory 22 via a path 53. In decoder 16 the addresses and coefficients are decoded into their original form. Decoder 21 performs the same function with respect to the motion vectors.

An information line 54 leads from buffer storage unit 15 to image block reconstruction circuit 20 with information as to whether the image block was encoded in an interframe or intraframe mode. A further information line 56 leads from buffer storage unit 15 to decoder 16, and transmits information as to the state of the buffer storage and the quantizing status.

FIG. 6 shows additional details of picture regeneration circuit 8 of FIG. 1. The output signal from HD decoder 7 of FIG. 1 is applied to a picture memory 38. One output of memory 38 leads to a picture interpolation circuit 37, and another output leads to a picture memory 39 and to a multiplexer 40.

First and second inputs of picture interpolation circuit 37 provide additional data from HD decoder 7, i.e., motion vectors 53 and the encoder mode information 54 (i.e. information as to interframe or intraframe coding). An output of interpolation circuit 37 leads to multiplexer 40. The output of multiplexer 40 provides an HD signal with 1440×864 pixels corresponding to a 5×3 image aspect ratio hereinafter referred to as the HDTV-TV signal.

The operation of picture generator 8 shown in FIG. 6 is illustrated in FIG. 7 by means of a one-dimensional example.

Each 2n+1 picture output from the HD decoder is stored in picture memory 38 of the picture regenerator. The previously transmitted 2n−1 picture is maintained in picture memory 39. The intermediate picture, 2n, was eliminated at the transmitter by picture suppression circuit 5.

FIG. 7 shows signals associated with picture interpolation circuit 37. A first input receives output signal 46 from picture memory 39 containing image information 49 and 50. The second input receives output signal 48 from picture memory 38. Output signal 47 containing picture information 51 is applied to multiplexer 40.

If image block 52 of the presently processed picture was transmitted in intraframe mode via the channel, then block 51 of intermediate picture 2n is directly determined from the 2n−1 picture and the 2n+1 picture on a block basis by means of a pixel averaging process (not shown in FIG. 7). In the case of an intraframe coding, however, motion vector 53 associated with image block 52 is known from the HD decoder. For image block 51, which is to be interpolated, image block 50 of the 2n−1 picture (46) which is shifted by half the amount of motion vector 54, is adopted. Furthermore, the 2n picture can be generated by pixel interpolation of the 2n−1 and 2n+1 picture elements which have been shifted in opposite directions by half the amount of the motion vector.

FIG. 8 shows details of spatial-temporal filter and combiner 9 in FIG. 1. The high temporal resolution, spatially interpolated TV signal—thus, as regards format, corresponding to the HDTV picture—which is generated by transformer 4 in FIG. 1 is applied to one input of a summing unit 41. The HD output signal from picture regeneration circuit 8 of FIG. 1 is applied to another input of summing unit 41. Summer 41 determines the sum of the absolute grey-scale differences of the two differently regenerated input image signals on a pixel-by-pixel basis via an n×n "window". The sum results in an output signal of value Z with a window dimension of n×n.

Output signal Z from summer 41 is received by a circuit 43, which determines factors for the weighting of the TV and HD video signals. Thus, in a multiplier 42 the TV signal is multiplied by a factor "a", whereas the HD signal is multiplied by a factor "1-a" in a multiplier 44. Dependent upon the value of signal Z, weighting factor "a" may take a value between 0 and 1.

If the value of signal is large, (i.e. if due to significant image motion erroneous interpolation results are present in picture generator 8 of FIG. 6) then factor a=1 and the picture information of the TV signal is adopted. If, on the contrary, the value Z is very small (i.e. if the video signal exhibits little or no image motion) then the data are taken from the HD signal, which contains the original high spatial resolution information. Output signals from multipliers 42 and 44 are added in a summing unit 45, the output signal of which corresponds to the initial HDTV signal.

The HD images transmitted via the second transmission channel are directly fed to the output of combination filter 9 in FIG. 1; correspondingly, factor "a" exhibits a value of zero for the entire image.

The image generation procedure is carried out by evaluating both channels at the receiver. For this purpose the images generated by the above-mentioned picture regenerating procedures are combined as follows. The differences between the high time resolution, spatially interpolated HDTV-TV signal (produced by transcoding) which corresponds to the HDTV as regards format, and the HDTV-HD picture generated by picture interpolation, are calculated pixel by pixel. Via an n×n window the sums of the absolute grey-scale differences of the two differently regenerated picture signals are determined and weighted on a pixel-by-pixel basis. By this process a weighting factor "a" is determined in the range between 0 and 1. The HDTV-TV and HDTV-HD video signals are combined with weighting factor a as follows: The HDTV-TV signal is multiplied by factor a, while the HDTV-HD signal is multiplied by factor 1-a.

If erroneous interpolation results have occurred during the regeneration of the HDTV-HD video signal due to significant image motion, then factor a=1 and the picture information of the HDTV-TV signal is adopted. If, on the contrary, the value of factor "a" is very small, i.e., the image information is essentially static, then the video information is taken from the HDTV-HD signal, as this represents the original high spatial resolution. The weighting factor "a" is set to 1 if the weighted sum of the absolute grey-scale values exceeds a threshold value which is smaller than 1. Up to this threshold value the value of the weighting factor increases proportionally from 0 to 1.

In addition, the weighted addition of the two channels can be improved by evaluating HD decoder information, i.e. information on the transmission mode, the quantizing status or the motion of the image block.

What is claimed is:

1. A system for processing television-type video signals, comprising
   a source of wide bandwidth high definition video signal containing temporally and spatially high resolution image information;
   means responsive to said high definition signal for providing a first video signal having a given temporal resolution and standard spatial resolution less than that of said high definition video signal;
   means responsive to said high definition signal for providing a second video signal having temporal resolution less than that of said first video signal and spatial resolution greater than that of said first video signal;

a first channel for conveying said first video signal;

a second channel for conveying said second video signal; and means for encoding at least one of said video signals conveyed by said first and second channels with information concerning the mode of video signal encoding and with motion vector information.

2. A system according to claim 1 wherein each of said first and second channels exhibits a bandwidth less than said wide bandwidth of said high definition video signal; and said first video signal is compatible with a standard television receiver.

3. A system according to claim 2, and further including means for reducing the data content of said second video signal prior to transmission.

4. A receiver system responsive to said first and second video signals according to claim 1; said receiver system comprising signal formatting means for providing a non-interlaced video signal with enhanced resolution compared to a standard television signal.

5. A system according to claim 4, wherein said formatting means includes field dependent line processing and interpolation means.

6. A system according to claim 4, further including means for converting the scanning rate of received signals.

7. A system according to claim 4, comprising decoder means for decoding received signals to develop motion vector information signals associated with image blocks to be reconstructed to produce an overall image; and image regeneration means responsive to signals including said motion vector signals from said decoder means for regenerating an image.

8. A system according to claim 7, wherein said image regeneration means develops an image signal with an increased image scanning frequency in response to motion vector information.

9. A system according to claim 8, wherein for generating a given image block (2n) said image regeneration means shifts an image block (2n−1 or 2n+1) adjacent to said given image block in response to approximately one-half the value of said motion vector information.

10. A system according to claim 8, wherein for generating a given image block (2n) said image regeneration means shifts image blocks (2n−1; 2n+1) adjacent to said given image block in opposite directions in response to approximately one-half the value of said motion vector information and interpolates said shifted image blocks on a pixel-by-pixel basis.

11. A system according to claim 8 wherein received video signals contain intraframe coded image blocks; and for generating a given image scan block (2n), said image regeneration means averages pixels of intraframe coded image block (2n−1) adjacent to said given image block with pixels of corresponding intraframe coded spatial image block (2n+1) adjacent to said given image block.

12. A system according to claim 7 comprising:

means for combining signals from said image regeneration means and signals from said signal formatting means to produce a combined signal;

a signal weighting circuit responsive to said combined signal for provided first and second weighted output signals;

a first signal multiplier responsive to an output signal from said signal formatting means and to said first weighted output signal;

a second signal multiplier responsive to an output signal from said image regenerating means and to said second weighted output signal; and means for combining output signals from said first and second signal multipliers.

13. A system according to claim 12, wherein gray-scale differences associated with a given image are summed on an image block basis using an n×n pixel window; and a weighting factor is determined for pixels of said image.

14. A system according to claim 13, wherein an image information generated from said non-interlaced signals from said formatting means is multiplied by a first weighting factor (a) for each pixel; and image information from said regeneration means is multiplied by a second weighting factor of (1-a).

15. A system according to claim 14 wherein said first weighting factor (a) is equal to unity if the weighted sum of absolute gray-scale differences exceeds a given threshold.

16. A system according to claim 15, wherein below said threshold the value of said first weighting factor (a) increases proportional to the weighted sum of absolute gray scale differences.

17. A system according to claim 13, wherein said weighting factor is a function of the video signal transmission mode, the status of video signal quantization or motion information.

18. A system for processing television-type video signals, comprising a source of wide bandwidth high definition video signal containing temporally and spatially high resolution image information;

means responsive to said high definition signal for providing a first video signal having a given temporal resolution and standard spatial resolution less than that of said high definition video signal;

means responsive to said high definition signal for providing a second video signal having temporal resolution less than that of said first video signal and spatial resolution substantially equal to that of said high definition video signal;

means for encoding said second video signal conveyed by said second channel with information concerning at least one of the mode of video signal encoding and image motion;

a first channel for conveying said first video signal; and a second channel for conveying said second video signal.

19. A receiver system responsive to first and second video signals derived from a source of a wide bandwidth high definition video signal containing temporally and spatially high resolution image information and conveyed by first and second channels respectively, said first video signal having a given temporal resolution and standard spatial resolution less than that of said high definition video signal; said second video signal having a temporal resolution less than that of said first video signal and spatial resolution substantially equal to that of said high definition video signal; said receiver system comprising signal formatting means responsive to received signals of said first channel for providing a video signal with enhanced resolution compared to a standard television signal;

decoder and image regeneration means responsive to received signals of said second channel for regenerating an image signal;

means for combining signals from said decoder and image regeneration means with signals from said signal formatting means to produce a combined signal;

a signal weighting circuit responsive to said combined signal for provided first and second weighted output signals;

a first signal multiplier responsive to an output signal from said signal formatting means and to said first weighted output signal;

a second signal multiplier responsive to an output signal from said decoder and image regenerating means and to said second weighted output signal; and means for combining output signals from said first and second signal multipliers.

20. A system according to claim 19, wherein
gray-scale differences associated with a given image are summed on an image block basis using an n×n pixel window; and
a weighting factor is determined for pixels of said image.

21. A system according to claim 20, wherein
image information generated from said signals from said formatting means is multiplied by a first weighting factor (a) for each pixel; and
image information from said regeneration means is multiplied by a second weighting factor of (1-a).

22. A system according to claim 21, wherein
said first weighting factor (a) is equal to unity if the weighted sum of absolute gray-scale differences exceeds a given threshold.

23. A system according to claim 22, wherein
below said threshold the value of said first weighting factor (a) increases proportional to the weighted sum of absolute gray scale differences.

24. A system according to claim 20, wherein
said weighting factor is a function of the video signal transmission mode, the status of video signal quantization or motion information.

25. A receiver system responsive to a second video signal conveyed by a second channel, said second video signal having a temporal resolution less than that of a first video signal conveyed by a first channel and having spatial resolution substantially equal to that of a high definition video signal from which said first and second video signals are derived, said receiver comprising:

decoder means for decoding said received second signal to develop image motion representative information associated with image blocks to be reconstructed to produce an overall image; and image regeneration means responsive to information including said motion information for regenerating an image signal.

26. A system according to claim 25, wherein
said image regeneration means develops an image signal with an increased image scanning frequency in response to motion vector information.

27. A system according to claim 26, wherein
for generating a given image block (2n) said image regeneration means shifts an image block (2n−1 or 2n+2) adjacent to said given image block in response to approximately one-half the value of said motion vector information.

28. A system according to claim 26, wherein
for generating a given image block (2n) said image regeneration means shifts image blocks (2n−1; 2n+1) adjacent to said given image block in opposite directions in response to approximately one-half the value of said motion vector information and interpolates said shifted image blocks on a pixel-by-pixel basis.

29. A system according to claim 26 wherein
received video signals contain intraframe coded image blocks; and
for generating a given image scan block (2n), said image regeneration means averages pixels of intraframe coded image block (2n−1) adjacent to said given image block with pixels of corresponding intraframe coded spatial image block (2n+1) adjacent to said given image block.

30. A receiver system responsive to first and second video signals conveyed by first and second channels respectively, said first video signal having a given temporal resolution and standard spatial resolution less than that of a high definition video signal from which said first video signal is derived, said second video signal having a temporal resolution less than that of said first video signal and a spatial resolution substantially equal to that of said high definition video signal from which said second video signal also is derived; said receiver comprising first means responsive to said first video signal for modifying the scanning format of said first video signal to generate a third video signal having the same scanning format as said second video signal;

second means responsive to said second video signal for modifying the field rate of said second video signal to generate a fourth video signal having the same field rate as said first video signal; and third means responsive to said third and fourth video signals for producing an image representative signal.

31. A receiver according to claim 30, wherein
said second video signal includes encoded motion representative information; and
said second means includes means for deriving said motion representative information from said second video signal.

32. A system for processing television-type video signals derived from a source of wide bandwidth high definition video signal containing both temporally and spatially high resolution image information, said video signals including a first video signal having a given temporal resolution and standard spatial resolution less than that of said high definition video signal, and a second video signal having temporal resolution less than that of said first video signal and spatial resolution substantially equal to that of said high definition video signal; said apparatus comprising:

first receiver means selectively responsive to said first video signal for reproducing an image having said given temporal resolution and said standard spatial resolution;

second receiver means responsive to both said first and second video signals for reproducing an image having said temporally and spatially high resolution; and third receiver means selectively responsive to said second video signal for reproducing an image having said given temporal resolution and said spatially high resolution.

* * * * *